No. 686,426. Patented Nov. 12, 1901.
J. SPECHT.
STIRRING PLOW.
(Application filed Jan. 28, 1901.)
(No Model.)
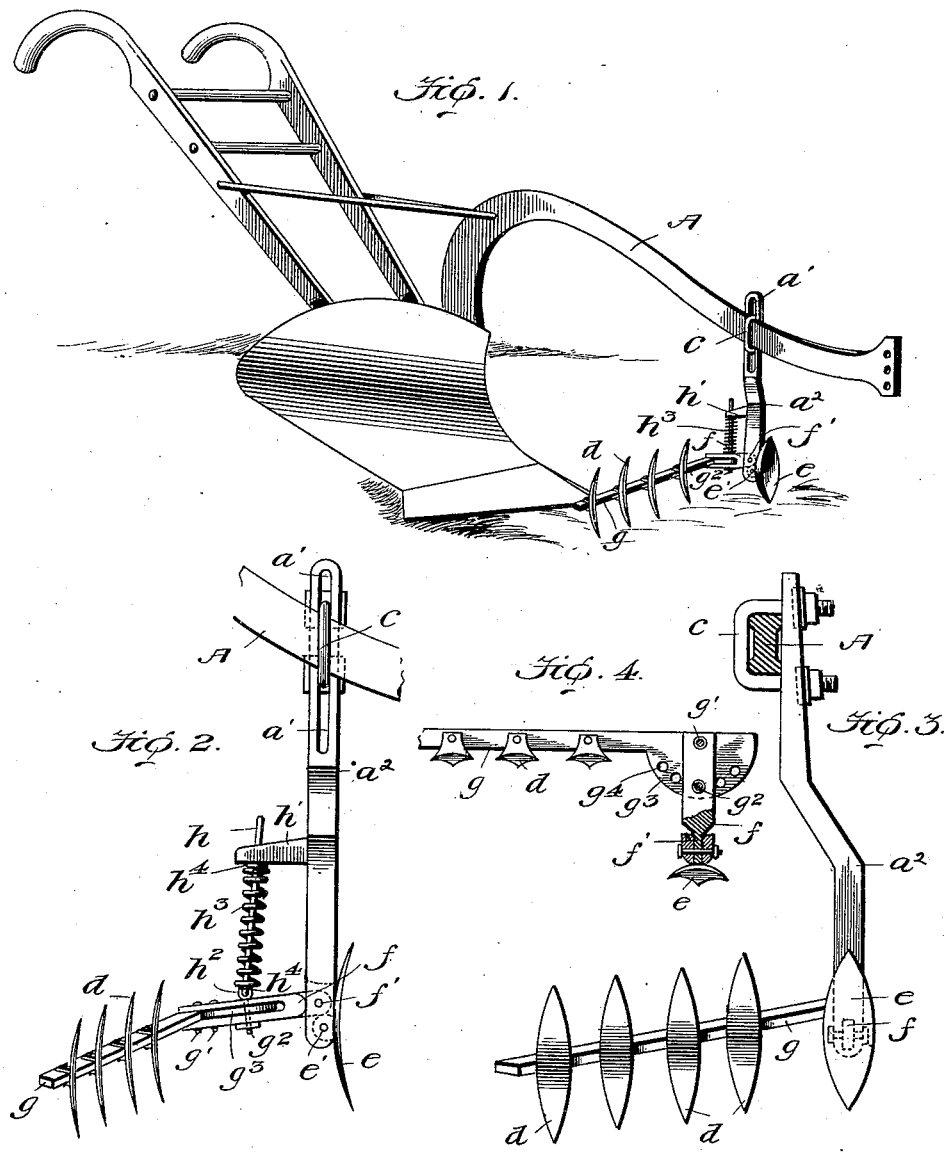
Witnesses
John Specht,
Inventor

UNITED STATES PATENT OFFICE.

JOHN SPECHT, OF WOODLAKE, NEBRASKA.

STIRRING-PLOW.

SPECIFICATION forming part of Letters Patent No. 686,426, dated November 12, 1901.

Application filed January 28, 1901. Serial No. 45,167. (No model.)

*To all whom it may concern:*

Be it known that I, JOHN SPECHT, a citizen of the United States, residing at Woodlake, in the county of Cherry and State of Nebraska, have invented a new and useful Improvement in Plows, of which the following is a specification.

My invention relates to certain new and useful improvements in stirring-plows; and the novelty resides in the peculiarities of construction and the combination and arrangement of parts hereinafter more fully described and then particularly pointed out in the appended claims.

The invention is illustrated in the accompanying drawings, which, with the letters of reference thereon, form a part of this specification, in which—

Figure 1 is a perspective view of a turning-plow with my improvements applied thereto. Fig. 2 is a view showing the shovels detached from the plow-beam. Fig. 3 is a view with the beam in section, showing a modified form; and Fig. 4 is a plan view of the beam carrying the shovels and associated parts.

Like letters of reference indicate like parts throughout the several views.

Referring now to the details of the drawings by letter, $a$ designates a standard, which is designed to be detachably affixed to the plow-beam A in any suitable manner. In the present instance I have chosen to show it as attached by means of a clasp or clamp or staple $c$, the ends of which are screw-threaded and after passing through vertical slots $a'$ in the standard and embracing the beam are provided with nuts and washers, as seen clearly in Fig. 3. By this means the standard is firmly clamped to the beam, but is capable of vertical adjustment as occasion may require. This standard is formed with an offset $a^2$, as seen clearly in Fig. 3, so as to throw the lower end and the shovel $e$, carried thereby, on a line with the point of the plow. The shovel $e$ is pivotally mounted, as at $e'$, on the lower end of the standard $a$, as seen best in Fig. 1.

Referring to Figs. 1 and 2, $f$ is a bar pivotally mounted, as at $f'$, on the lower end of the standard $a$, and this arm is bifurcated, as is shown clearly in said views, and in its outer end is pivotally mounted the bar $g$ on a pivot $g'$ and provided with a fastening device, as a bolt or nut $g^2$. (Seen best in Figs. 2 and 4, wherein it will be observed that the bar $g$ is provided with a semicircular end $g^3$, having the openings $g^4$, designed to be engaged by the bolt $g^2$, so that the bar $g$ may be readily adjusted to and held in any desired position.)

$d$ represents shovels mounted upon the bar $g$, and although they may be of any desired number I have chosen in this instance to show four, which is the preferred number.

$h$ is a rod, the upper end of which is movable through an opening in a bracket $h'$, extending laterally from the standard $a$, and its other end pivotally connected, as at $h^2$, with the bolt $g^2$, as seen best in Fig. 2. $h^3$ is a spring around this rod and confined between collars $h^4$, as is clearly seen in Fig. 2.

It will be readily seen that the bar $g$ and its shovels $d$ may be turned to any desired angle or inclination with relation to the line of draft and that they will be regulated by the spring just described.

A plow constructed in accordance with the above description will be found most serviceable, the combing-shovels $d$ and the shovel $e$ gathering and raking the weeds and stubble into a furrow in a manner well understood in the art.

What is claimed as new is—

1. A plow attachment comprising a standard, a bifurcated bar mounted on the lower end thereof; a bar pivotally mounted in the outer end of the bifurcated bar and carrying a plurality of shovels and means passed through the bifurcated bar and engaging the last-mentioned bar for holding the same in its adjusted position, as set forth.

2. A plow attachment comprising a standard having a vertical slot, means passed through said slot for attaching it to a plow-beam, said standard having an offset to bring its lower end in line with the point of the plow, and a shovel mounted upon the lower end of said standard, a bar pivotally mounted on the lower end of the standard and a bar pivotally mounted therein and carrying a plurality of combing-shovels substantially as described.

3. The combination of a standard, a bar extending laterally from the lower end thereof; a bar pivotally mounted therein and carrying a series of combing-shovels, means for holding the shovel-bar in its adjusted position and a spring interposed between the pivoted bar and a bracket on the standard substantially as described.

JOHN SPECHT.

Witnesses:
 A. S. HAND,
 R. N. BRUCE.